United States Patent
Hanusiak et al.

(10) Patent No.: US 10,657,230 B2
(45) Date of Patent: *May 19, 2020

(54) ANALYSIS OF OUTPUT FILES

(71) Applicant: INTERNATIONAL BUSINESS MACHINES CORPORATION, Armonk, NY (US)

(72) Inventors: Tomasz Hanusiak, Czarny Dunajec (PL); Konrad W. Komnata, Kraków (PL); Jaroslaw Osinski, Mrozy (PL); Grzegorz Szczepanik, Kraków (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,451

(22) Filed: Nov. 21, 2017

(65) Prior Publication Data
US 2018/0307810 A1    Oct. 25, 2018

Related U.S. Application Data

(63) Continuation of application No. 15/491,364, filed on Apr. 19, 2017.

(51) Int. Cl.
*G06F 21/10* (2013.01)
*G06F 16/14* (2019.01)
(Continued)

(52) U.S. Cl.
CPC .......... *G06F 21/105* (2013.01); *G06F 16/148* (2019.01); *G06F 16/1734* (2019.01); *G06F 16/164* (2019.01); *G06F 2221/0773* (2013.01)

(58) Field of Classification Search
CPC .......... G06F 21/10; G06F 21/50; G06F 21/52; G06F 21/105; G06F 2221/033; G06F 2221/034; G06F 2221/0773; G06F 17/30106; G06F 17/30144; G06F 21/00; G06F 16/16; G06F 16/164; H04L 67/1002
(Continued)

(56) References Cited

U.S. PATENT DOCUMENTS 6,212,512 B1    4/2001  Barney et al.
7,174,341 B2    2/2007  Ghukasyan et al.
(Continued)

OTHER PUBLICATIONS

List of IBM Patents or Patent Applications Treated as Related; (Appendix P), Filed Nov. 21, 2017; 2 pages.
(Continued)

*Primary Examiner* — Khang Do
(74) *Attorney, Agent, or Firm* — Cantor Colburn LLP; Jeffrey S LaBaw

(57) ABSTRACT

Embodiments include method, systems and computer program products for file management. Aspects include monitoring a device to determine an execution of a new process on the device. Based at least in part on the new process starting, a file system is monitored for the creation of a new file, wherein the new file includes one or more file characteristics. The one or more file characteristics are compared to a knowledge database to determine a file type for the new file and the new file is associated with the new process based at least in part on determining the file type for the new file.

5 Claims, 7 Drawing Sheets

(51) Int. Cl.
*G06F 16/17* (2019.01)
*G06F 16/16* (2019.01)

(58) Field of Classification Search
USPC .............................................. 726/33; 718/1
See application file for complete search history.

(56) References Cited

U.S. PATENT DOCUMENTS

| | | | |
|---|---|---|---|
| 8,005,847 | B2 | 8/2011 | Levy et al. |
| 8,015,221 | B1* | 9/2011 | Smith ............... G06F 17/30144 |
| | | | 707/825 |
| 8,103,591 | B2 | 1/2012 | Bouchet |
| 8,725,647 | B2 | 5/2014 | Disciascio et al. |
| 8,756,201 | B1 | 6/2014 | Dutch et al. |
| 9,448,893 | B1* | 9/2016 | Whitehead ........ G06F 17/30144 |
| 2006/0184507 | A1 | 8/2006 | Lefferts et al. |
| 2009/0038018 | A1* | 2/2009 | Mikami .................. G06F 21/10 |
| | | | 726/27 |
| 2009/0124375 | A1* | 5/2009 | Patel ....................... G07F 17/32 |
| | | | 463/29 |
| 2010/0082774 | A1* | 4/2010 | Pitts .................. G06F 17/30144 |
| | | | 709/219 |
| 2010/0100565 | A1* | 4/2010 | Adachi .................. G06F 21/10 |
| | | | 707/781 |
| 2010/0161837 | A1* | 6/2010 | Miyajima ............. G06F 21/105 |
| | | | 710/8 |
| 2011/0131315 | A1 | 6/2011 | Ferris et al. |
| 2011/0307958 | A1* | 12/2011 | Ashton .................. G06F 21/105 |
| | | | 726/26 |
| 2013/0254897 | A1* | 9/2013 | Reedy ..................... G06F 21/10 |
| | | | 726/26 |
| 2013/0262265 | A1* | 10/2013 | Song .................. G06Q 10/0631 |
| | | | 705/26.41 |
| 2013/0282755 | A1* | 10/2013 | Procopio ........... G06F 17/30126 |
| | | | 707/770 |
| 2014/0137259 | A1* | 5/2014 | Chen ..................... G06F 21/105 |
| | | | 726/26 |
| 2015/0018089 | A1* | 1/2015 | Caldas ................ G07F 17/3241 |
| | | | 463/29 |
| 2015/0150142 | A1* | 5/2015 | Austin .................. G06F 3/1222 |
| | | | 726/26 |
| 2016/0034492 | A1* | 2/2016 | Harrison .......... G06F 17/30091 |
| | | | 707/652 |
| 2016/0171190 | A1* | 6/2016 | Lin ......................... G06F 21/10 |
| | | | 726/30 |
| 2016/0217147 | A1* | 7/2016 | Boyle ............... G06F 17/30094 |
| 2017/0161662 | A1* | 6/2017 | Wang ............... G06Q 10/06315 |

OTHER PUBLICATIONS

Tomasz Hanusiak et al., "Analysis of Output Files", U.S. Appl. No. 15/491,264, filed Apr. 19, 2017.
Hudson, Andrew, "The BeOS file system: an OS geek retrospective," https://arstechnica.com/information-technology/2010/06/the-beos-filesystem/; Jun. 3, 2010, pp. 1-22.

* cited by examiner

ANALYSIS OF OUTPUT FILES

DOMESTIC PRIORITY

The present application claims priority to U.S. Non-provisional application Ser. No. 15/491,364 filed on Apr. 19, 2017, titled "ANALYSIS OF OUTPUT FILES," assigned to the assignee hereof and expressly incorporated by reference herein.

BACKGROUND

The present invention relates to file management, and more specifically to a system to analyze output files.

Information technology (IT) asset management in important for any sized organization. Assets include all elements of software and hardware that are found in a business environment. Organizations, typically, employ sets of business practices that work to manage these assets with respect to any financial, contractual, and/or inventory limitations. An example of a contractual limitation for IT asset management would be software licenses for software programs residing on hardware assets of the organization. Any violations of software licensing can open up an organization to legal consequences such as contractual legal claims as well as potential claims for copyright violations.

SUMMARY

Embodiments include a computer-implemented method for file management. The method includes monitoring a device to determine an execution of a new process on the device. Based at least in part on the new process starting, a file system is monitored for the creation of a new file, wherein the new file includes one or more file characteristics. The one or more file characteristics are compared to a knowledge database to determine a file type for the new file and the new file is associated with the new process based at least in part on determining the file type for the new file.

Embodiments include a computer system for file management, the computer system including a processor, the processor configured to perform a method. The method includes monitoring a device to determine an execution of a new process on the device. Based at least in part on the new process starting, a file system is monitored for the creation of a new file, wherein the new file includes one or more file characteristics. The one or more file characteristics are compared to a knowledge database to determine a file type for the new file and the new file is associated with the new process based at least in part on determining the file type for the new file.

Embodiments also include a computer program product for file management, the computer program product including a non-transitory computer readable storage medium having computer readable program code embodied therewith. The computer readable program code including computer readable program code configured to perform a method. The method includes monitoring a device to determine an execution of a new process on the device. Based at least in part on the new process starting, a file system is monitored for the creation of a new file, wherein the new file includes one or more file characteristics. The one or more file characteristics are compared to a knowledge database to determine a file type for the new file and the new file is associated with the new process based at least in part on determining the file type for the new file.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

Figure 1:
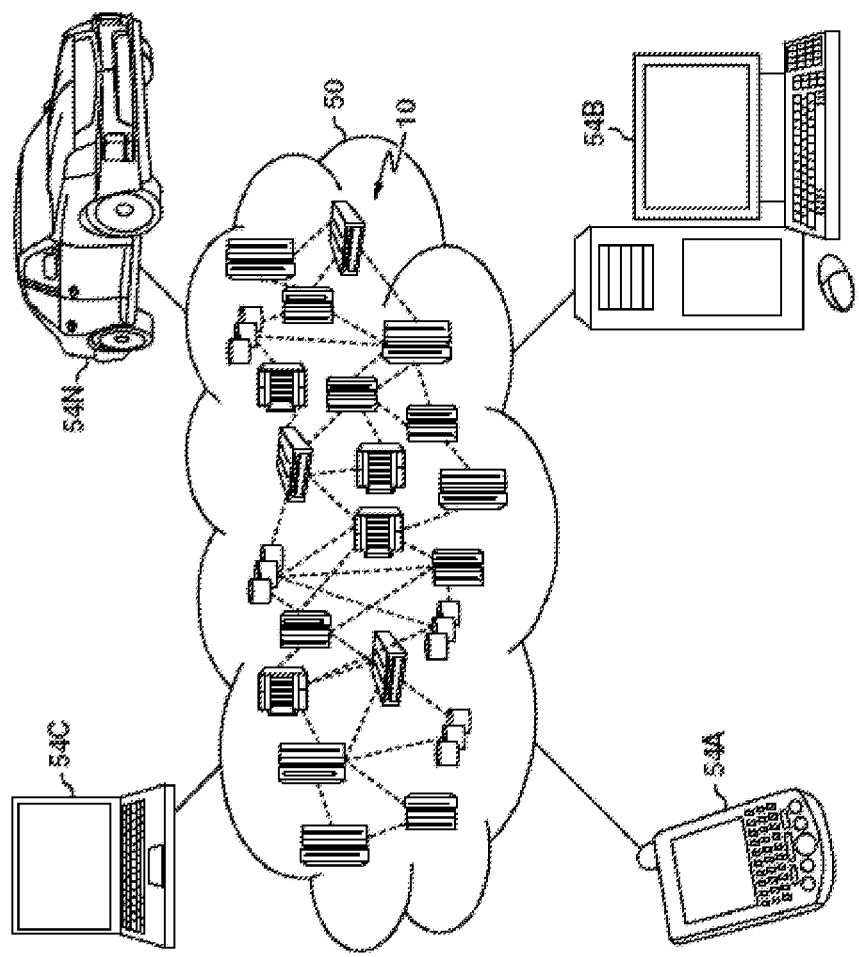
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
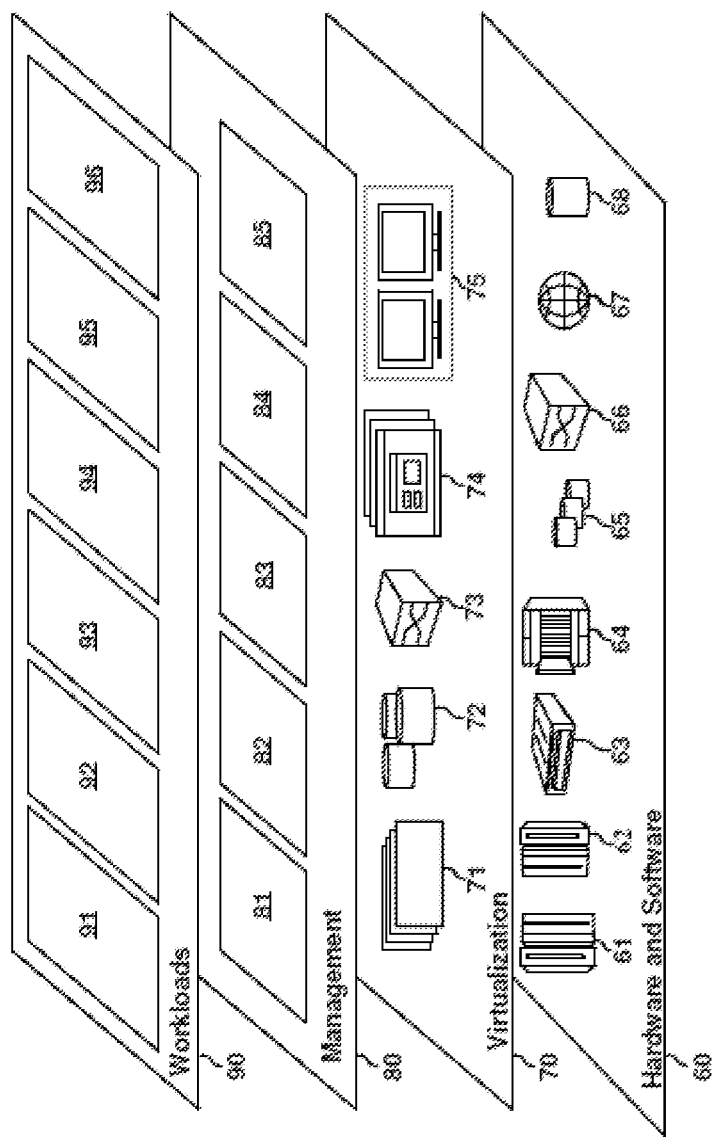
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file management 96.

Figure 3:
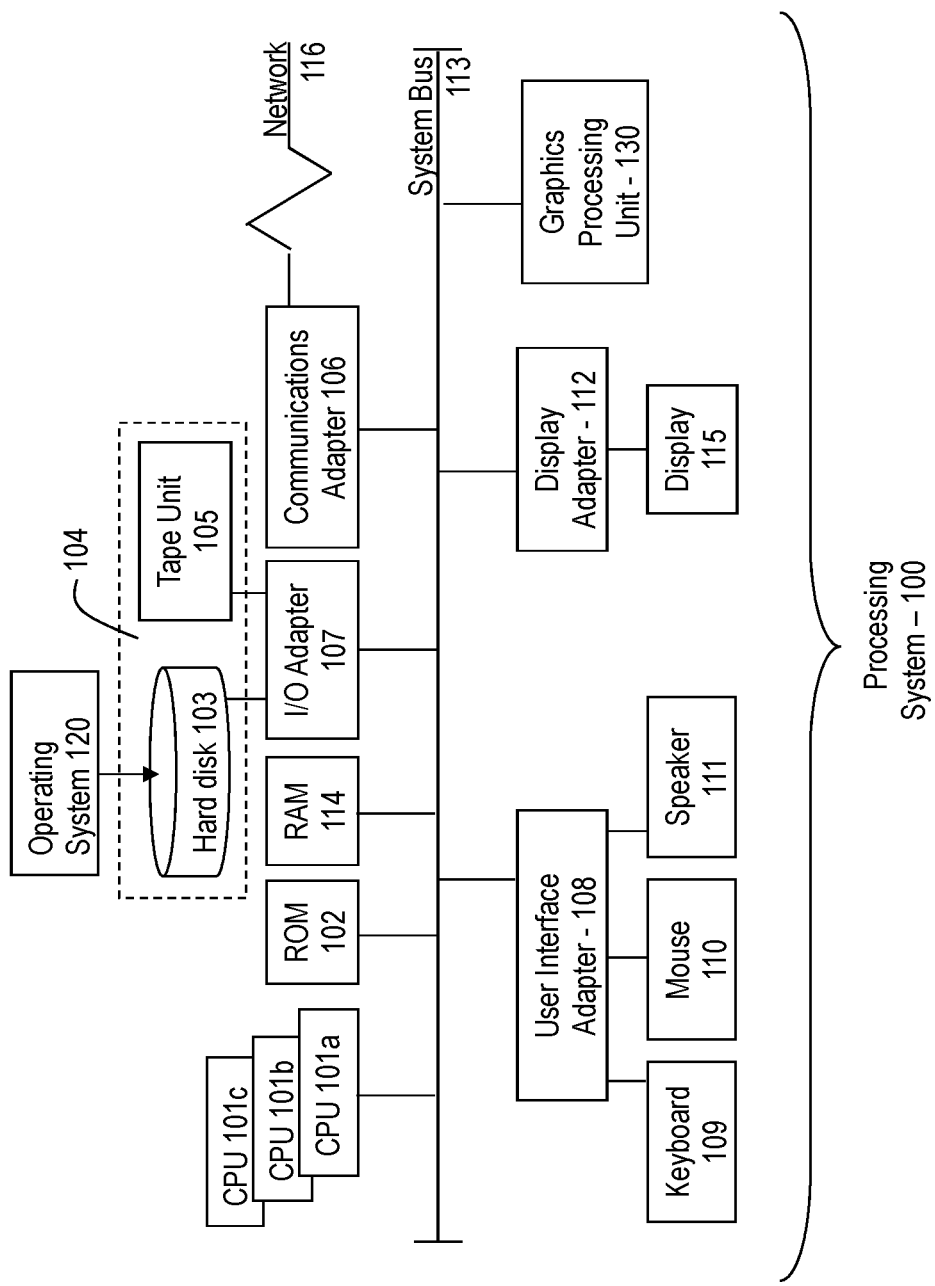
FIG. 3 depicts a block diagram of a computer system according to one or more embodiments of the present invention.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

An overview of technologies that are more specifically relevant to aspects of the invention deal with IT asset management which includes a set of business practices that manage assets such as software and hardware owned and/or operated by a business organization. Of particular interest in IT asset management is the management of software installed on hardware assets and the associated software licenses that have been purchased by an organization. Any hardware assets (devices) operating software without a software license can result in legal consequences for a business. Management of this software can be done through the management of lists of software that identify what particular devices are running the software for each license and periodic audits of the software installed on devices by IT managers. However, these audits do not continuously monitor the network or devices to find output files that are created, identifying the software process that generated the output file, and comparing software processes on the devices that created the output files to the software licenses owned for the devices.

Turning now to an overview of the aspects of the invention, one or more embodiments of the invention address the above-described shortcomings of the prior art by providing methods, systems, and computer program products for file management. Aspects of the invention include monitoring output files for one or more devices connected to a file management system, such as a server. Any output files that are created are compared to software applications running on a device to associate the output file with a particular software application. The output file is compared to a knowledge database which includes file type characteristics that are compared to the file characteristics of the output file to determine the software process that generated the output file.

Figure 4:
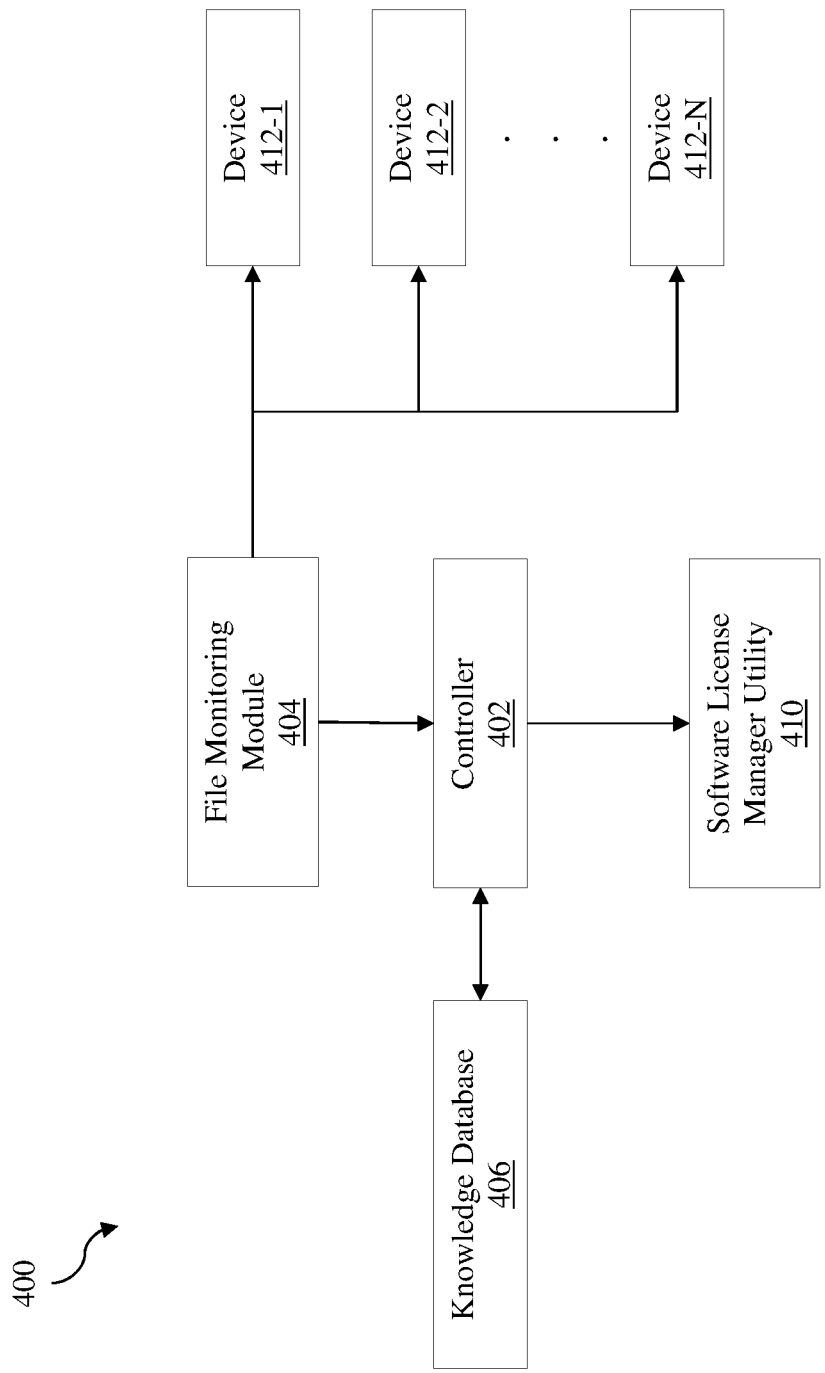
FIG. 4 depicts a block diagram of a system for file management in accordance with one or more embodiments of the present invention.

FIG. 4 is a block diagram depicting a system for file management according to one or more embodiments. The system 400 includes a controller 402, a file monitoring module 404, a knowledge database 406, a software license manager utility 410, and a set devices 412-1, 412-2, . . . , 412-N (where N=any whole number greater than 2).

In one or more embodiments of the invention, the controller 402 and the file monitoring module 404 can be implemented on the processing system 100 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments, the controller 402 operates to analyze output files generated by software programs (also referred to as processes). A file monitoring module 404 monitors the set of devices 412-1, 412-2 . . . 412-N to determine when a new process is started. In this sense, the new process can be software already installed on the device 412 and opened or can be a process that has never been opened on the device 412. The file monitoring module 404 can be an application installed on a server that monitors the generation of output files on to the file system on the server. The file monitoring module 412 can also be a daemon or other background application or regular software application installed locally on the set of devices 412-1, 412-2 . . . 412-N to monitor the generation of output files stored locally to the device 412 or stored on a server. The set of devices 412-1, 412-2 . . . 412-N include computer desktops, laptops, servers, and any other electronic device that can operate software and generate and save output files from the software. For example, the set of devices 412-1, 412-2 . . . 412-N can be all desktop computer and laptops operated by a business organization. These devices can generate and store output files locally and/or store output files on a server system connected to the device.

In one or more embodiments, when a new output file is created, the file monitoring module 404 forwards the characteristics of the output file to the controller 402. The characteristics (also known as schema) include naming pattern, extensions, size, folder in which created, length of content, language of content, file format (e.g., XML, JSON, etc.), header/footer in content, and certain strings in content (e.g., name of process that generated the output file). The characteristic of the output file are compared to data in the knowledge database 406. The knowledge database 406 includes information about files and file characteristics. The knowledge database 406 is regularly updated to include the latest information about files and file types. The updated information can be obtained from software companies and/or other software knowledge databases. Updating the knowledge database 406 with data can be an independent, self-learning process that includes monitoring behavior of a software process and focuses on matching generated files to certain processes. The knowledge database 406 also includes information about locations of possible output files which the file monitoring module 404 can regularly scan to identify these output files and then match the output files to a process.

In one or more embodiments, a software license manager utility 410 includes a list of all software program licenses owned by an organization for each device in the set of devices 412-1, 412-2 . . . 412-N. When an output file is generated and the software program associated with the output file is identified, the controller 402 compares the software program to the software licenses to ensure that a device is operating the correct software license to comply with any license agreement. In addition to a list of software program licenses, the software license manager utility 410 includes other information about the software program license such as, for example, if the license agreement specifies that the software licenses are required per device, per processor, per core, and/or per thread operating the software. In a server environment, some software licenses are determined based on the number of physical cores on a server. A multi-core processor is a single computing component with two or more independent actual processing units (i.e., "cores"), which are units that read and execute program instructions. With a multi-core processor, a software license can require the purchase of additional licenses per physical core.

In one or more embodiments of the invention, the system 400 analyzes the computing environment (e.g., devices 412-1, 412-2 . . . 412-N) that is operating a process and compares the computing environment to the number of licenses necessary to operate the software. For example, an output file is created taking a certain amount of time to generate the output file on a device. The system 400 compares this performance to other devices that have different hardware configurations but similar performance to operate the process generating the output file. The system 400 optimizes the licenses needed to operate a process and generate output files based on the hardware configurations that dictate the number of licenses. As a further example, an initial device may be a 2-core processor operating a software application. Another device may be a single core processor. If the single core processor can achieve similar performance operating the software application, the software is moved to the other device with the single core to reduce the number of licenses needed to operate the process and saving on costs. In this example, for a per core license, the licenses necessary for this process would be reduced from 2 to 1 by going from a 2-core processor to a single core processor.

In one or more embodiments, machine learning can be utilized to assist with updating the knowledge database 406. Machine learning can be used to match generated files to certain processes as well as tracking the processes to determine that a process might generate a certain type of output file. Machine learning techniques include Random Forests, Decision Tree, Ada boost, SVM, k nearest neighbors, and Naïve Bayes.

In one or more embodiments, the file characteristics (i.e., schema) can be inputted into a vector for known file types.

The file characteristics can be stored in the knowledge database 406. This vector of file characteristics is utilized as labeled training data for a machine learning algorithm to help identify file types created in a file system. The machine learning algorithm can classification and clustering techniques to group file types based on the associated file characteristics in the vector. Additionally, the machine learning algorithm can look at unlabeled training data to help identify patterns for output files and associate the output files with running processes on a device.

In one or more embodiments, the machine learning algorithm can analyze additional file characteristics such as file locations that are associated with a specific process and associate the output file type stored in the file locations with a running process. Also, the timing of the creation of an output file with the running of certain processes can be used to associate the output file with the process. For example, after a new process is started on a device, an output file is stored in a file system. The output file can continue to grow in size as this new process is running. After the output file stops growing in size, the new process is closed. The output file can be associated with the new process based on the timing of the creation of the output file and the timing of the operation of the new process. The knowledge database 406 is updated based on this association for further use when the same type of output file is created in the file system.

Figure 5:
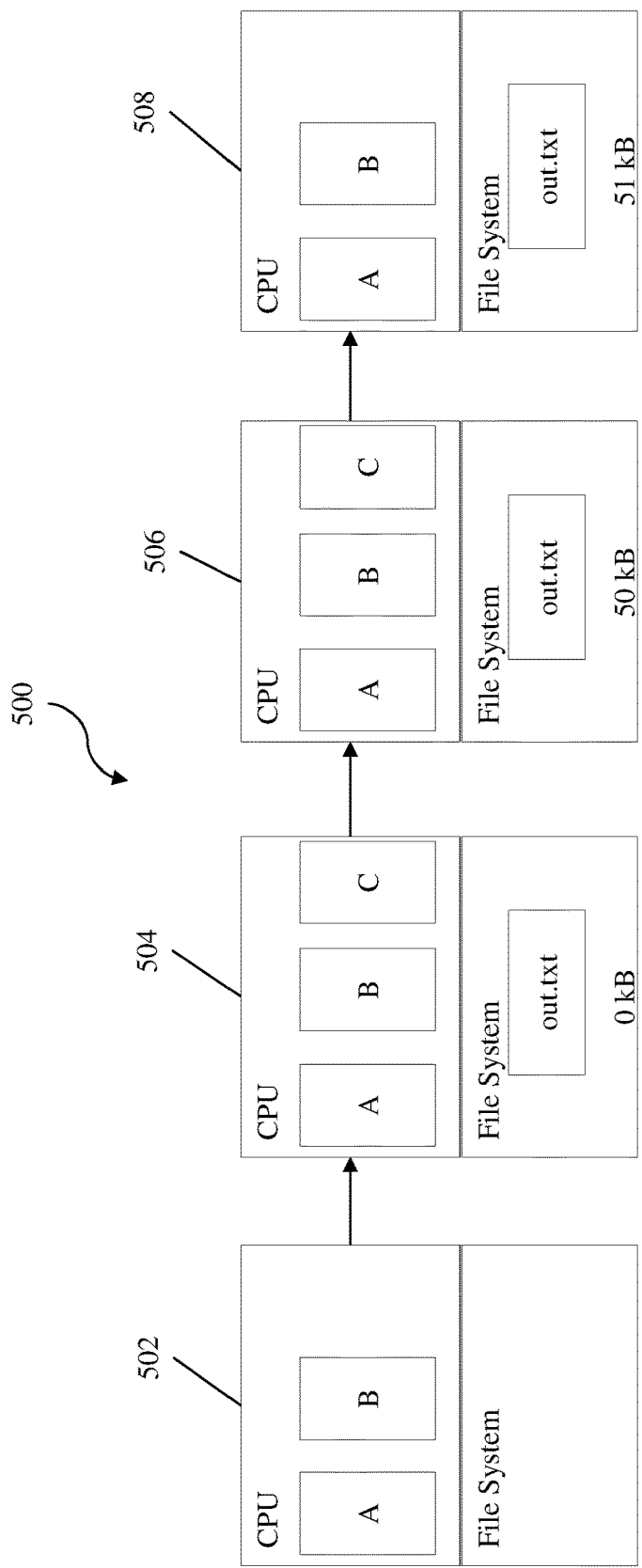
FIG. 5 depicts a block diagram of an illustrated example for matching a generated output file to a process running on a device according to one or more embodiments of the present invention.

FIG. 5 depicts a block diagram of an illustrated example for matching a generated output file to a process running on a device according to one or more embodiments of the present invention. The example 500 includes blocks 502, 504, 506, and 508 which represent a device at different timestamps. As shown in block 502, a CPU has two processes operating, process A and process B. The CPU is in electronic communication with a file system which can be a network attached storage device or a storage local to the device. Block 504 depicts the CPU at a different timestamp with a new process, process C, running and an output file, out.txt, appears in the file system. At another timestamp, as shown in Block 506, the output file is increasing in size from the 0 kB (kilobytes) to 50 kB and process C is still running on the CPU. At yet another timestamp, as shown in Block 508, process C is no longer running and the output file is no longer increasing in size. The system 400 monitoring the processes and output files associates the output file, out.txt, with process C. Process C is associated with the output file type and the size of the output file so any the output files like out.txt of roughly the size of 50 kB can be associated with process C.

In one or more embodiments, the system 400 tracks the creation and storing of output files. These output files, once identified, are matched to the associated process and device running the process. The software license manager utility 410 compares the software licenses for a device with the processes running on the device to ensure compliance. Historical usage data is tracked for the software license for each to device to determine if a device is in need of certain software licenses. For example, if a threshold usage of a process is not exceeded, a software license may be unassigned from the device and the device user may be notified they no longer have rights to use the process. Another threshold can be set that monitors if a process is utilized in excess of the threshold. For example, if a single-core server software is accessed above a threshold, this can signal to an administrator that the process may need an additional core added with an additional software license. Or the administrator can make another server available with a software license for users of the process based on the utilization. The software license manager utility 410 also compares license pricing to determine the best license for a process based on utilization and other characteristics of the process usage such as the output file types being created. For example, if a full spreadsheet software is being utilized to create only comma delineated files, the software license manager utility 410 could recommend a cheaper license level or even a different software license that can create the same output file type.

Figure 6:
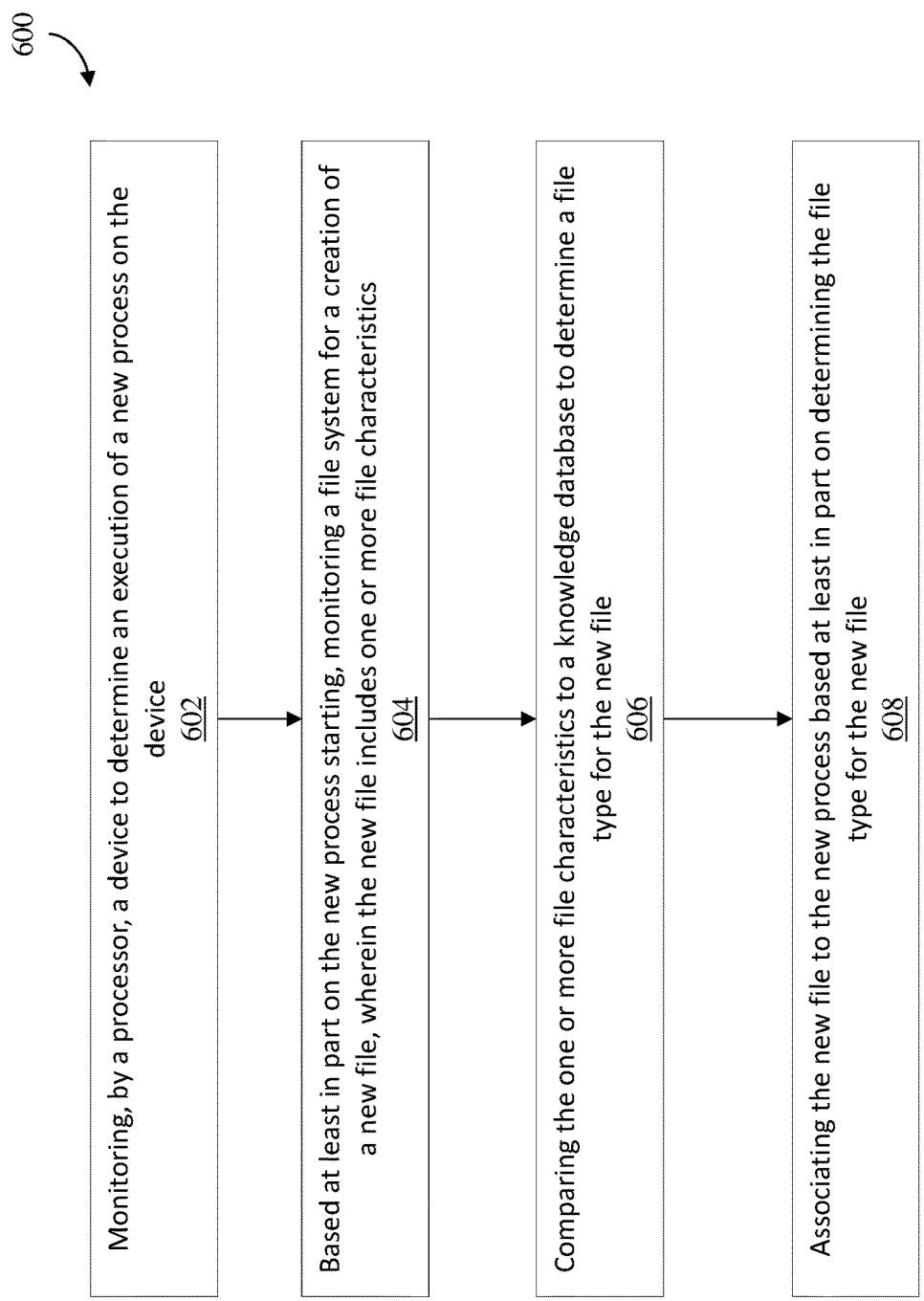
FIG. 6 depicts a flow diagram of a method 600 for file management according to one or more embodiments of the present invention.

FIG. 6 depicts a flow diagram of a method 600 for file management according to one or more embodiments of the present invention. The method 600, at block 602, includes monitoring, by a processor, a device to determine an execution of a new process on the device. The method 600, at block 604, includes based at least in part on the new process starting, monitoring a file system for a creation of a new file, wherein the new file includes one or more file characteristics. At block 606, the method 600 includes comparing the one or more file characteristics to a knowledge database to determine a file type for the new file. The method 600 includes associating the new file to the new process based at least in part on determining the file type for the new file, as shown at block 608.

Additional processes may also be included. It should be understood that the processes depicted in FIG. 6 represent illustrations and that other processes may be added or existing processes may be removed, modified, or rearranged without departing from the scope and spirit of the present disclosure.

Figure 7:
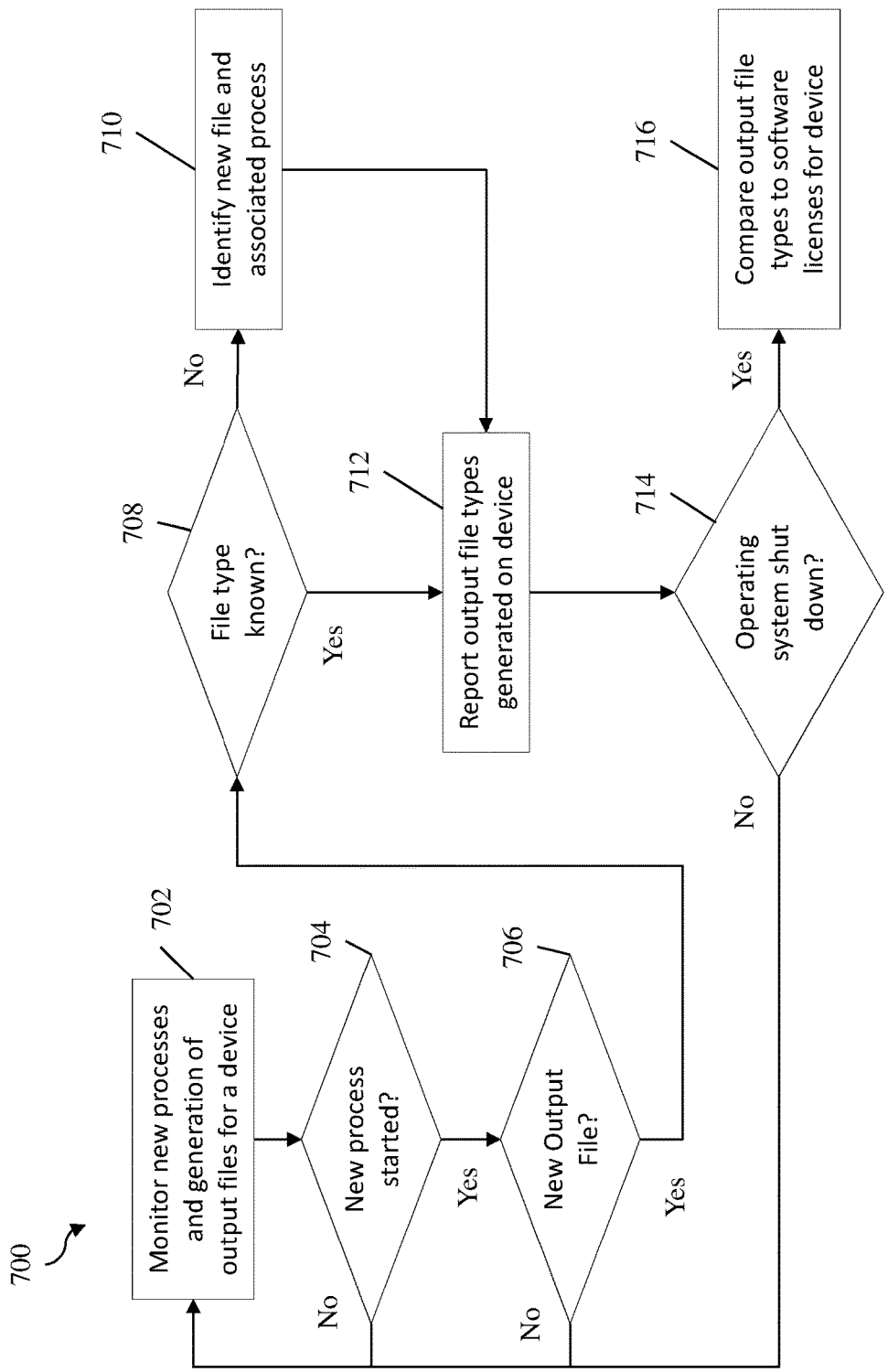
FIG. 7 depicts a flow diagram of an exemplary method for file management according to one or more embodiments of the present invention.

FIG. 7 depicts a flow diagram of an exemplary method for file management according to one or more embodiments of the present invention. The method 700 includes monitoring new processes and the generation of output files for a device, as shown at block 702. The monitoring can be done by the file monitoring module 404 either running on the device or running on a server. An example program for file monitoring is a daemon or some other small process that monitors all processes and changes in a file system. The method 700, at block 704, is a decision block to see if a new process has started. If no new process has started, the method 700 continues to monitor for new processes and the generation of output files. If a new process has started, the method 700, at block 706, determines if a new output file appears in the file system. If not new output file, the system continues to monitor. If a new output file appears, the method, at block 708, attempts to determine a file type for the output file. If the file type is unknown, the method 700 identifies the new file and the associated process. This can be achieved through the system 400 verifying and matching a process to an output file based on the file monitoring and the creation of a new file while a process is running. It can be further confirmed through verifying the process has finished and the output file is no longer increasing in size. If the file type is known, the method 700 reports the output file types generated on the device, as shown at block 712. The report can be in any form and sent to an IT professional within a business organization. Once the operating system (OS) shuts down for the device, as shown at block 714, the method 700 compares the output file types generated on the device to the software licenses assigned to the device, as shown at block 716. If the OS has not shut down, the method 700 continues to monitor new processes and output files.

Additional processes may also be included. It should be understood that the processes depicted in FIG. 7 represent illustrations, and that other processes may be added or existing processes may be removed, modified, or rearranged without departing from the scope and spirit of the present disclosure.

In one or more embodiments of the invention, if a software process running on a device is determined to be in violation of a software license or if a software license does not exist for a software process, the system 400 can take a remedial action. Remedial actions include but are not limited to shutting down access to the device, sending a notification to the user of the device, sending a notification to an IT professional, and/or shutting down the software process. The system 400 can also be utilized to monitor utilization of software licenses based at least in part on the number of output files produced. If a large number of licenses exist but there is low utilization, the system 400 can report this lack of utilization and IT personnel can remove these non-utilized programs from devices. For example, if utilization of a fully licensed program that creates a certain type of extensions is low, an IT professional can be notified. The IT professional may realize that the full license is not necessary based on the number of output files created and may switch to a partial license. An example of this would be a view only program versus a program that can generate files. An organization may only need to view certain files and not necessarily need to create those files. A full license would not be necessary to provide a solution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for file management, the method comprising:
    monitoring, by a processor, a device to determine an execution of a new process on the device;
    based at least in part on the new process starting, monitoring a file system for a creation of a new file, wherein the new file includes one or more file characteristics;
    comparing the one or more file characteristics to a knowledge database to determine a file type for the new file;
    associating the new file to the new process based at least in part on determining the file type for the new file;
    monitoring a first set of processing characteristics required to create the new file on the device;
    determining a first hardware configuration for the device, where the device is a first device;
    identifying a second device, the second device including a second hardware configuration;
    analyzing the first hardware configuration and the second hardware configuration to determine that the second hardware configuration requires fewer software licenses to run the new process with similar processing characteristics to the first set of processing characteristics;
    moving the new process to the second device; and
    removing the new process from the first device.

2. The method of claim 1 further comprising:
    based at least on a determination that the one or more file characteristics are not in the knowledge database, associating the new file with the new process; and
    updating the knowledge database to include the associated new file with the new process.

3. The method of claim 1 further comprising:
    receiving, by the processor, a set of software licenses associated with the device; and
    comparing the new process to the set of software licenses to determine that the device running the new process complies with the set of software licenses.

4. The method of claim 3 further comprising:
    comparing the new process to the set of software licenses to determine that the device running the new process violates at least one software license in the set of software licenses.

5. The method of claim 4 further comprising:
    based at least in part on the determination that the device running the new process violates at least one software license in the set of software licenses, initiating a remedial action.

* * * * *